April 29, 1930. J. J. WEBER Re. 17,654
SURFACE ORNAMENTATION
Original Filed March 3, 1926
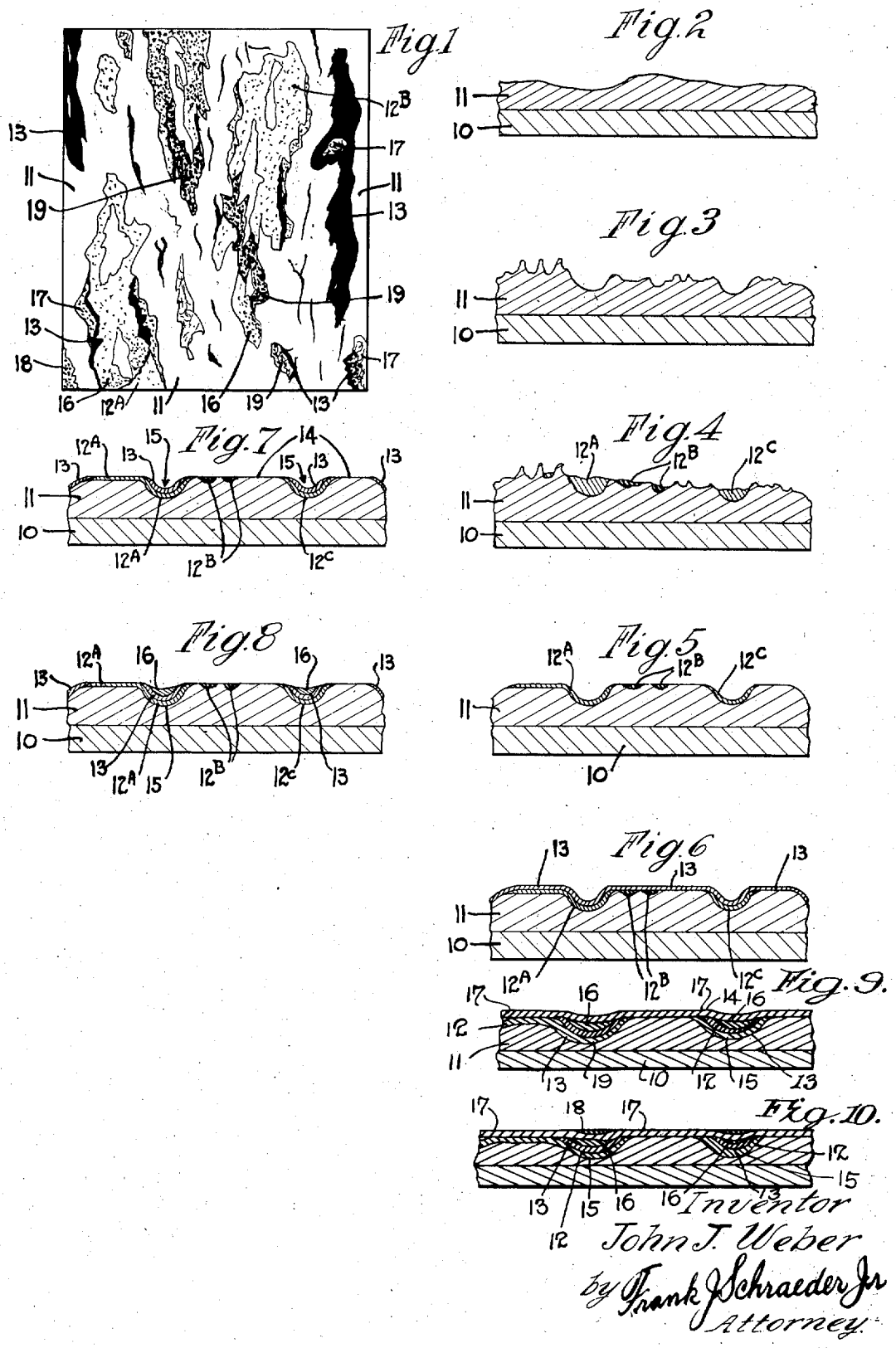

Reissued Apr. 29, 1930 Re. 17,654

UNITED STATES PATENT OFFICE

JOHN J. WEBER, OF WILMETTE, ILLINOIS, ASSIGNOR TO J. H. JOCHUM, JR., OF CHICAGO, ILLINOIS

SURFACE ORNAMENTATION

Original No. 1,608,281, dated November 23, 1926, Serial No. 91,868, filed March 3, 1926. Application for reissue filed April 18, 1927. Serial No. 184,782.

This invention relates in general to surface ornamentation, and one of the objects of the invention is to provide an improved composition of matter and method of applying same as a coating or covering to a surface to produce a product simulating marble, tile, stones, brick and the like, and which coating or covering will protect the surface to which it is applied and will not peel or chip therefrom.

Another object of my invention is to provide an improved method of surface ornamentation wherein the successive steps of work done will produce a finished ornate surface presenting to view two or more separate applications of colors or portions thereof which have been successively applied during the production of same.

A further object is to provide an improved method of this character which may be employed by the average person skilled in applying plastic materials to surfaces.

To the attainment of these ends and the accomplishment of other new and useful objects as will appear, the invention consists in the new and useful surface ornamentation and in substantially the method hereinafter described and claimed and illustrated in the accompanying drawing, in which:

Figure 1 is a plan view representing a portion of one of the finished products;

Figures 2 to 9, respectively are sectional views (greatly exaggerated) illustrating the different steps in a method of producing my invention;

Figure 10 is a sectional view of one of the finished products.

Throughout the specification the method will be described in connection with producing ornamentation in simulation of marble, but it is to be understood that this is not to be considered as a term of limitation or that the method is to be limited to this product, as the same method can be employed for producing an ornamentation in simulation of other articles or products.

In carrying out one method of operation, the ornamentation is placed upon a supporting surface 10 which may be a wall, a sheet of material, or any other surface which is to be coated.

To this surface 10 there is applied a paste-like body 11 which may be of any suitable material of a semi-plastic or comparatively thick consistency, such as a putty-like composition or thick paint.

The material or composition 11 is applied to the supporting object 10 in any suitable manner such as by means of a brush or trowel, and is preferably applied unevenly throughout the area of the surface, as shown in Figure 2.

The material which has thus been applied is then manipulated in any suitable manner, preferably by means of a stiff brush, trowel, or a dry sponge, so as to "pull" the material to roughten the same, as shown in Figure 3.

Suitable coloring matter, preferably in the form of heavy or thick paint-like consistency is then applied to the roughened surface at different places or spots on the surface, as indicated at $12^A$, $12^B$ and $12^C$, in Figure 4, and according to the desire of the operator.

The product is then allowed to dry, after which the entire exposed surface together with the coloring matter which has been applied thereto, is then smoothed down lightly as shown in Figure 5, which will cause the coloring matter to spread to some extent with the surface of the material constituting the body of the ornamentation.

The product may then be allowed to thoroughly dry, after which the exposed surface is rubbed down by means of an abrasive material, such as sand paper, or pumice stone and water, the pumice stone used preferably being in a lump or block. This rubbing down step is for the purpose of removing the high spots of the exposed surface, and preferably so that a large portion of the exposed area will be smooth, but so that the exposed area will contain crevices or depressions at different points thereof.

After this rubbing operation, a coloring material 13, as shown in Figure 6, preferably of some dark color or colors and preferably of the consistency of thick or plastic paint, is applied in any suitable manner, such as by means of a trowel or stiff brush or the like, to the entire exposed area.

After the coating 13 has been applied, a rubbing stone or preferably a scraping tool is used for rubbing away the coating from the higher surfaces causing the coating to enter into the crevices or lower areas. This will be accomplished by reason of the fact that the surface is thus rubbed while the paint-like coating material is still wet with the result that it will partially flow into the crevices or depressions.

The product may then be allowed to become thoroughly dry, after which the exposed surface may again be rubbed with an abrasive material or tool. This operation is performed until all of the coloring matter or coating 13 is rubbed off of the high spots or areas 14 (as shown in Figure 7), while the walls of the low areas or crevices 15 will still be covered with the coating of coloring matter 13.

Coloring matter preferably in the form of a paint-like compound of a thick consistency, and if desired of different colors, is then applied within the deep parts or crevices 15 as shown at 16, in Figure 8, and allowed to dry, after which the surface is again rubbed with an abrasive material, very lightly, preferably with fine sand paper.

As shown in Figure 9 a solution of wax, preferably beeswax and turpentine, is prepared to a paste like consistency, and this solution is applied preferably by means of a cloth over the entire exposed surface of the product.

The coating of wax is employed so that the filling in the crevices will bind upon the surface and the coating is allowed to "set" for approximately ten minutes. With another portion of the wax solution, there is mixed a dry zinc composition or any suitable white composition to produce a semi-plastic compound.

This compound is applied as at 18, to the remaining low portions or crevices throughout the entire surface so as to fill them up and also to give a coloring effect to the finished product at different points through the exposed surface. This filling is allowed to "set" for approximately ten minutes after which the entire surface is polished by means of a hard stone such as agate so as to produce a finished article or product.

It may be noted that the basic composition 11 may be unevenly applied to desirable areas or spots upon the surface 10 in any suitable manner, as by means of a stiff brush, trowel or other suitable tool.

The product resulting from this method will have the appearance of marble or a marble surface which will be of a pleasing and artistic appearance and the surface cannot be readily distinguished, from a distance, from marble.

While the preferred steps in the method have been herein specifically described, it is to be understood that some modification in the various steps may be employed without departing from the spirit of this invention.

I claim:

1. The method of producing surface ornamentation, which consists in unevenly applying to a surface material of a semi-plastic or comparatively thick consistency, then manipulating the surface of said material to roughen the same, then introducing coloring matter in different areas of the material, then allowing the same to dry, then partially smoothing the roughened material to smooth off portions of the high spots, then coating the exposed surface, then removing the last recited coating from the high spots, then applying a filler of a different color to fill in the crevices or low areas, and finally when dry polishing the entire exposed surface of the coating material.

2. The method of producing surface ornamentation, which consists in unevenly applying to a surface material of a semi-plastic or comparatively thick consistency, then manipulating the surface of said material to roughen the same, then introducing coloring matter in the different areas of the material, then allowing the same to dry, then partially smoothing the roughened material to smooth off portions of the high spots, then coating the entire exposed surface, and allowing the same to dry, then removing the last recited coating from the high spots, then applying a filler of different color of said material to fill in the crevices or low areas, and finally after the entire exposed surface is dry, polishing the same with a polishing implement.

3. The method of producing surface ornamentation, which consists in unevenly applying to a surface a base of a material of semi-plastic or comparatively thick consistency, then manipulating the surface of said base to roughen the same, then introducing coloring matter in different areas of the material, then allowing the same to partially dry, then rubbing the exposed surface to smooth off portions of the high spots, then coating the entire exposed surface, and allowing the same to dry, then removing the last recited coating from the high spots, then applying a composition filler of said material of different color to fill in the crevices or low areas, then allowing the filler to set, and finally polishing the entire exposed surface.

4. The method of producing surface ornamentation, which consists in applying to a surface a base of material of a semi-plastic or comparatively thick consistency, then pulling the surface to roughen the same, then applying coloring matter in different areas and allowing the whole to dry, then partially smoothing the exposed surface, then, after dry, removing with an abrasive and by rubbing process, some of the high spots of the exposed surface, then coating the entire exposed surface with a coloring material, then by means of an abrasive removing the coating from the high spots, then applying coloring material into the low areas, then filling in the crevices or low areas with a composition of a different color, and finally polishing the entire exposed surface.

5. The method of producing surface ornamentation, which consists in applying a plastic substance to such surface, then roughening the exposed surface of such substance, then applying coloring matter at different points, then partially smoothing out said substance and coloring matter, then rubbing down the high spots, then coating the entire surface with a coating of additional colored material, then rubbing away said coating from the high spots, then introducing additional coloring material into the low places or crevices, and finally polishing the entire exposed surface.

6. The method of producing surface ornamentation, which consists in applying a plastic basic substance to such surface, then roughening the exposed surface of such substance, then applying coloring matter at different points, then partially smoothing out the surface of the material and coloring matter, and rubbing down the high spots, then coating the entire surface with a coating material of different color, then rubbing down the coating from the high spots, then introducing additional coloring material into the low places or crevices, and finally polishing the entire surface.

7. A method of producing surface ornamentation which comprises the steps of successively applying coatings of material of different colors and uneven thicknesses of cross sections to the surface to be ornamented, drying and abrasively gradually leveling each portion of said composition before applying the subsequent portion of said compositions, said abrasive operations smoothening the surface of the ornamentation and thereby presenting to view varying and irregular areas of the colored compositions, and finally when the surface of the product is leveled or smoothened by such successive applications and abrasive operations, polishing the ornate surface.

JOHN J. WEBER.